W. SCHIERDING.
MOTOR PROPELLED VEHICLE.
APPLICATION FILED NOV. 15, 1913.
1,142,204.
Patented June 8, 1915.
3 SHEETS—SHEET 1.
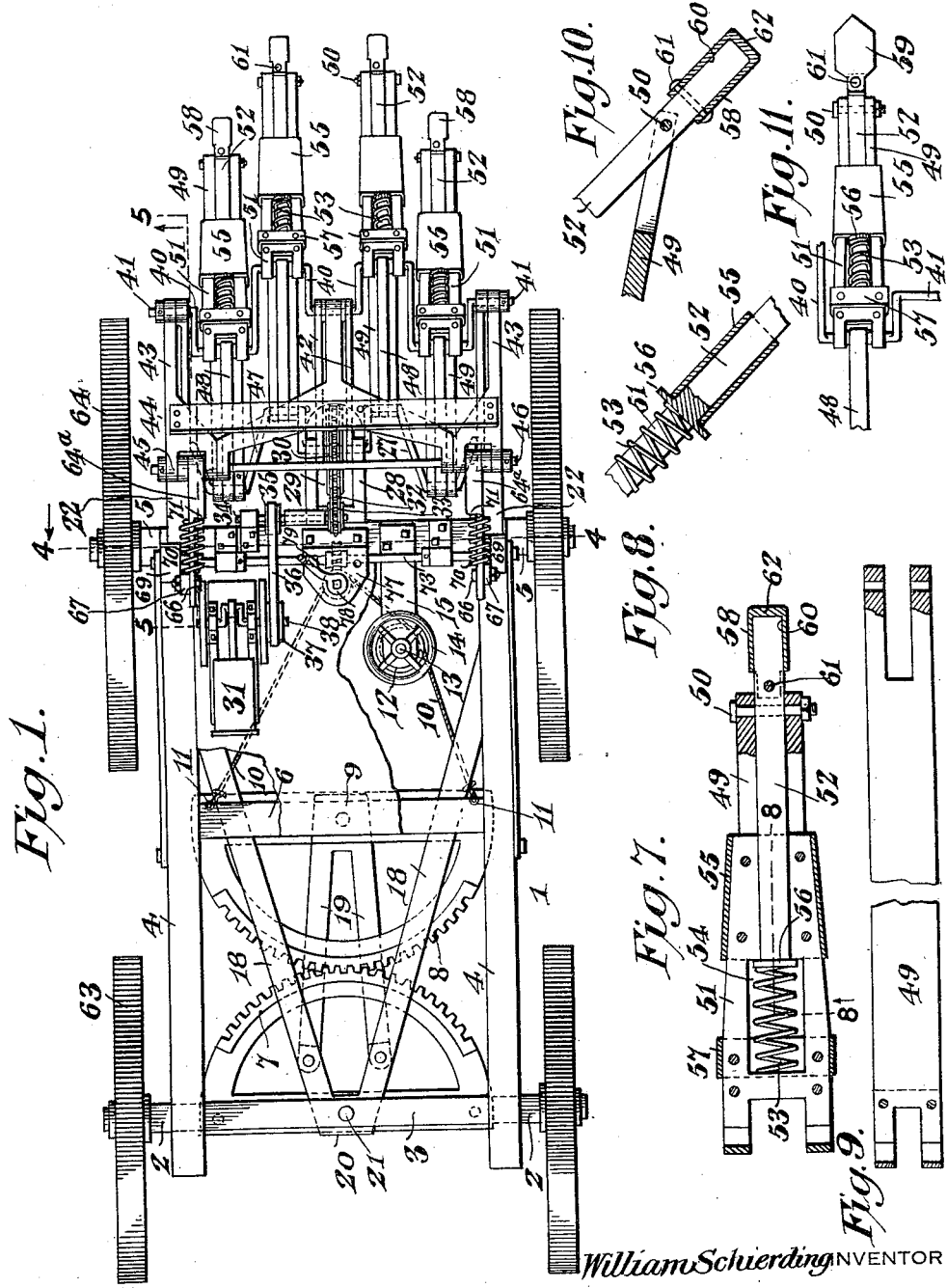
WITNESSES
William Schierding INVENTOR
BY
ATTORNEYS

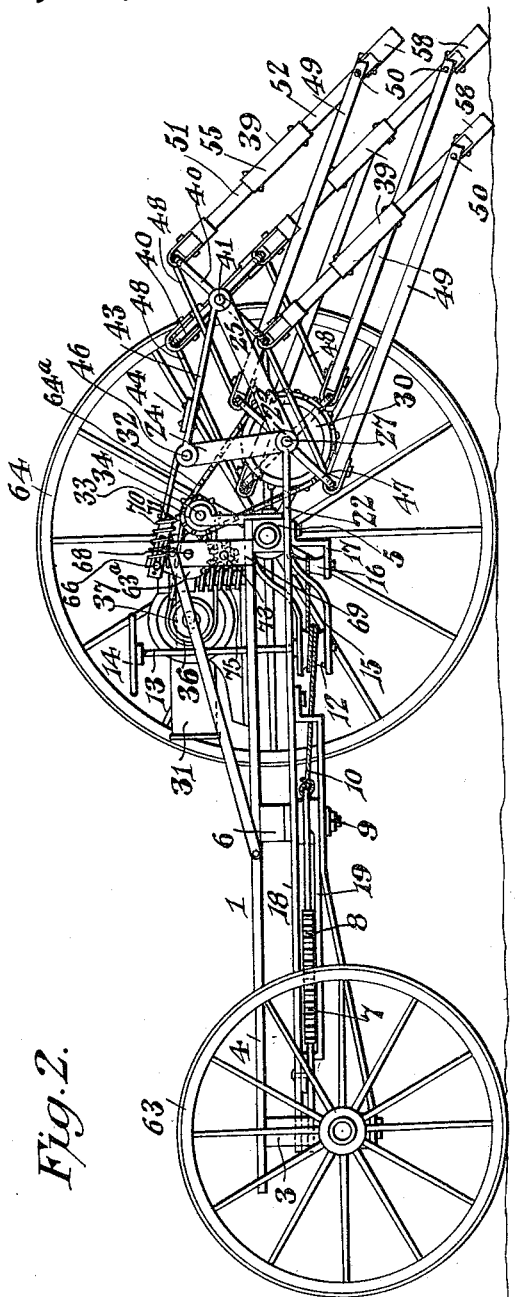

W. SCHIERDING.
MOTOR PROPELLED VEHICLE.
APPLICATION FILED NOV. 15, 1913.
1,142,204.
Patented June 8, 1915.
3 SHEETS—SHEET 3.
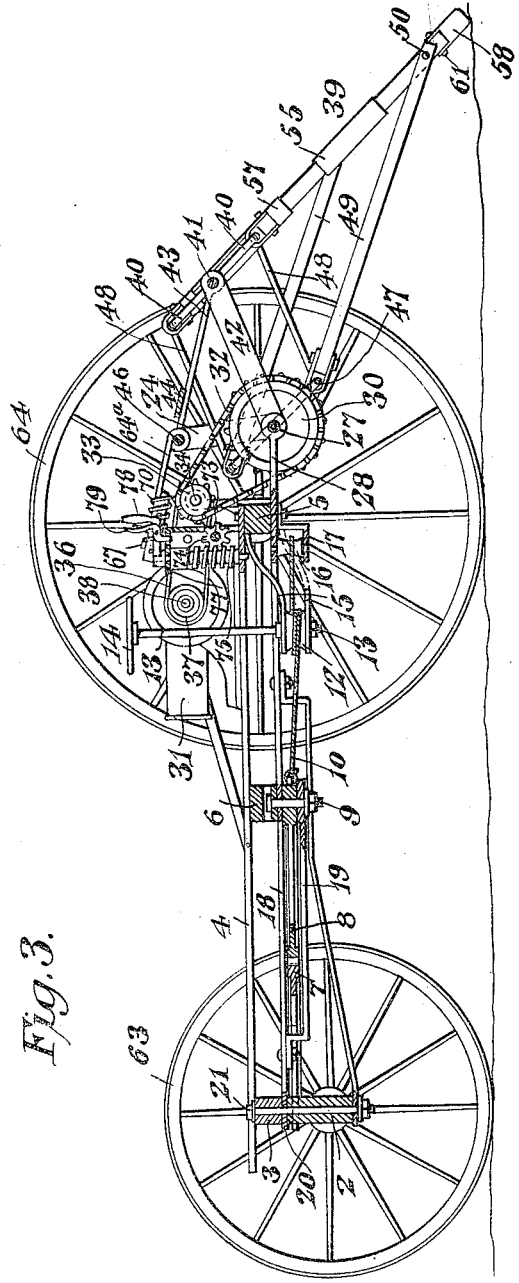
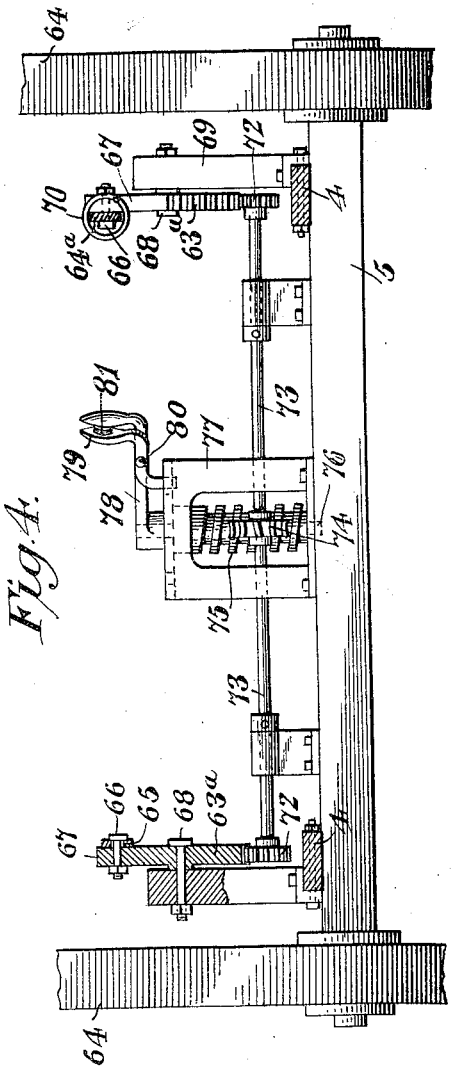
WITNESSES
William Schierding, INVENTOR
BY
ATTORNEYS

UNITED STATES PATENT OFFICE.

WILLIAM SCHIERDING, OF WALLACE, IDAHO.

MOTOR-PROPELLED VEHICLE.

1,142,204.  Specification of Letters Patent.  Patented June 8, 1915.

Application filed November 15, 1913. Serial No. 801,197.

*To all whom it may concern:*

Be it known that I, WILLIAM SCHIERDING, a subject of the Emperor of Germany, residing at Wallace, in the county of Shoshone and State of Idaho, have invented certain new and useful Improvements in Motor-Propelled Vehicles, of which the following is a specification.

The invention relates to improvements in motor propelled vehicles.

The object of the present invention is to improve the construction of motor propelled vehicles, more especially the construction of the propelling mechanism and to provide simple, efficient and comparatively inexpensive propelling mechanism of strong and durable construction adapted to be readily applied to various kinds of vehicles, whether wheeled or sleighs, and capable of yieldingly engaging a roadway or other surface at a plurality of points, and of rapidly propelling a vehicle without liability of its pushing or propelling bars being injured through contact with inequalities of rough surfaces.

A further object of the invention is to provide adjustable propelling mechanism capable of being readily raised and lowered to arrange it clear of the ground and also to position it properly to suit the height of the vehicle and the character of the surface over which the same may be traveling so as to secure a proper engagement therewith.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a motor propelled vehicle constructed in accordance with this invention. Fig. 2 is a side elevation of the same. Fig. 3 is a central longitudinal sectional view of the motor propelled vehicle. Fig. 4 is a transverse sectional view on the line 4—4 of Fig. 1. Fig. 5 is a detail longitudinal sectional view on the line 5—5 of Fig. 1. Fig. 6 is an enlarged detail view of a portion of one of the units of the propelling mechanism. Fig. 7 is a detail sectional view of one of the pusher or propelling bars. Fig. 8 is a detail sectional view on the line 8—8 of Fig. 7. Fig. 9 is a detail view of one of the inclined bracing members for holding the lower portions of the propelling bars. Fig. 10 is a detail sectional view of the lower portion of one of the pusher or propeller bars. Fig. 11 is a detail view of one of the pushers or propellers equipped with a shovel for engaging a soft surface.

Like numerals of reference designate corresponding parts in all the figures of the drawings.

In the accompanying drawings in which is illustrated the preferred embodiment of the invention, only the running gear 1 of a wheeled vehicle is illustrated, as the invention is applicable to all kinds of vehicles and the particular construction of the body of the vehicle does not constitute a portion of the present invention and may be varied in construction as desired. The running gear 1 includes a front axle 2 pivotally connected with and supporting a front bolster 3 to which is secured the front ends of the side bars 4. The side bars 4 extend rearwardly to and are supported by a rear axle 5 to which they are secured; and the said side bars are connected by intermediate cross bar 6 and constitute the supporting frame work of the running gear, but the latter may of course be varied to suit the character of the vehicle to which the propelling mechanism is applied. The front axle carries a toothed segment 7 preferably secured to the upper face of the axle and extending rearwardly therefrom and meshing with a toothed segment 8 mounted on a central pivot 9 and connected at opposite sides with the terminals of a cable 10 or other suitable flexible connection. The pivot 9 is suitably mounted on the running gear at the intermediate transverse bar 6 thereof and segment 8 is provided at opposite sides with perforations 11 to receive the ends of the cable, but the latter may be attached to the pivoted segment 8 in any other suitable manner and its intermediate portion is spirally arranged on a drum 12 of a vertical shaft 13 equipped at its upper end with a steering wheel 14 and mounted in suitable bearings of spaced supporting arms 15 between which the drum 12 is arranged. The steering wheel is adapted to be turned similarly to the steering wheel of an automobile for oscillating the pivotally mounted segment to turn the front axle on its axis for steering the latter, and while the shaft of the steering wheel is shown in a vertical position, it may be arranged in any other suitable manner.

The vertical shaft 13 is located at one side of the median plane of the vehicle and one of the side branches or portions of the cable 10 extends directly from the drum to the pivoted segment, and the other side portion or branch of the cable passes around a centrally arranged guide pulley 16 and extends therefrom to the opposite side of the pivoted segment. The guide pulley is located back of the vertical shaft and is laterally offset from the longitudinal plane of the same a sufficient distance to afford an easy pull on the side of the pivoted segment to which the adjacent guided portion of the cable is connected. The guide pulley is mounted in a suitable bracket or support 17 which is suitably mounted on the rear axle. Any other suitable means may be employed for properly guiding the cable or other flexible connection of the steering mechanism. The segments are preferably open and consist of curved peripheral portions and straight diametrically arranged connecting portions. The peripheral portions are located beneath forwardly converging reach bars or braces 18 and are guided between the same, and a bottom brace 19 having forwardly diverging sides arranged in spaced relation with the reach bars and having upwardly bent front terminals secured to the same at the opening of the segment of the front axle, as clearly illustrated in Fig. 3 of the drawings. The rear end of the brace 19 extends to and is pierced by the pivot 9 of the segment 8. The forwardly converging reach bars or braces 18 are secured at their rear portions to the rear axle and they are preferably provided with an integral connecting front portion 20 through which the king bolt 21 of the front axle passes. No claim is made in the present application to the steering mechanism.

The reach bars or braces are extended beyond the rear axle to form supporting arms 22 bifurcated at their rear terminals 23 to receive side links or bars 24 and 25 of a pivotally mounted support, and having bearings at opposite sides of the bifurcations for the reception of terminal journals or gudgeons of a front crank shaft 27. The front crank shaft is journaled at its center in suitable bearings of an arm 28 extending rearwardly from the rear axle and preferably constituting a portion of the bracket or support 17 in which the guide pulley 16 is mounted, but the supporting arm may be constructed in any other suitable manner. The central rearwardly extending supporting arm is provided with a slot or bifurcation 29 for the reception of a sprocket wheel 30 suitably fixed to the front crank shaft at the center thereof and connected with a gasolene engine 31 or other motor. As shown in the accompanying drawings, the sprocket wheel 30 is connected by a sprocket chain 32 with a sprocket pinion 33 of an intermediate transversely disposed countershaft 34 journaled in suitable bearings at the rear axle, and carries a pulley 35 which is connected by a belt 36 with a driving pulley 37 on the engine shaft 38, but any other suitable means may be employed for transmitting motion from the engine or motor 31 to the intermediate transverse shaft 34.

The front crank shaft 27 constitutes a pivot for the adjustable support which carries a plurality of propeller or push bars 39 hung from crank bends 40 of a rear crank shaft 41 having terminal gudgeons or journals and mounted in suitable bearings of the rearwardly extending side bars or links 25 and in bearings of central links or bars 42 and in bearings of intermediate and side arms 43 of a top connecting member 44 of the pivotal support. The top connecting member 44 is provided at the top with spaced eyes 45, receiving a transverse pivot 46 which is supported in a superimposed position with relation to the inner ends of the central and side links 42 and 25 by the side links 24 pivotally mounted on the terminal journals or gudgeons of the front crank shaft 27, as clearly illustrated in Fig. 2 of the drawings. The front crank shaft is provided with crank bends 47 corresponding in number and in position with the crank bends 40 of the rear crank shaft and connected therewith by parallel links or bars 48 which cause the front and rear crank shafts to move in unison. The crank bends extend radially from the axis of the crank shafts at different points around the same and any desired number of crank bends and propellers or push bars may be employed, four sets of such devices being illustrated in the accompanying drawings. The propeller or push bars are arranged in a perpendicular position when the rearwardly extending links or bars 25 and 42 are in a horizontal position, and they are maintained in such relative position by inclined braces or thrust bars 49 having bifurcated terminals to receive the front ends of the parallel links 4 and the lower portions of the push bars. Each inclined brace or thrust bar or member is provided at its upper or front end with bearings to receive the contiguous crank bend of the front crank shaft, and its lower or rear end is connected with the lower portion of the contiguous push bar by a transverse pivot 50.

The crank shafts are adapted to be rotated in either direction for propelling the vehicle forwardly or backwardly, and when the crank shafts are rotated in a forward direction the push bars are carried downwardly into engagement with the ground or other supporting surface when the crank bends swing downwardly and they are moved rearwardly with respect to the vehicle by the backward movement of the crank bends, and they are lifted by the upward movement of the crank bends at the end of each actuating stroke and are carried forward in an elevated position and again engaged with the supporting surface, the operation being repeated during the rotation of the crank shafts and the push bars successively engaging with the ground or other supporting surface through the opposite arrangement of the crank bends. By this construction, at least one of the pusher bars is in engagement with the ground, and is actuating the vehicle at all times.

Each pusher bar is composed of upper and lower members 51 and 52 and is equipped with a coiled cushioning spring 53 interposed between the members and arranged to cushion the stroke to effect an easy engagement of the same with the supporting surface and to prevent jar and vibration from being communicated to the vehicle and its occupants. The coiled spring is arranged in a slot or opening 54 in the upper member 51 which is provided at the lower portion with an encircling cuff 55 forming a guide for the lower member 52. The lower member 52, which is in the form of a shank or bar, is provided at its upper end with a head 56 which is engaged by the lower end of the coiled spring 53, and the upper portion of the coiled spring is arranged within a metallic strap 57 which extends around the upper sectional member of the push bar. The lower terminal portion of the section 52 of the push bar extends below the pivot 50 of the inclined brace or thrust bar and is adapted to receive either a shoe 58 or a shovel 59. The shoe 58, which may be constructed of metal or any other suitable material, is provided with a socket or opening 60 to receive the lower terminal portion of the push bar, and it is secured to the same by a bolt 61 or other suitable fastening device which pierces opposite side portions of the shoe. The shoe, which is provided with a solid lower end or wall 62 for engaging the ground, is designed to be used when the running gear is equipped with wheels 63 and 64, but when runners are used or when the vehicle is traveling over soft ground, the shoe 58 is removed and the shovel 59 is substituted therefor. The shovel which is secured to the push bar by the bolt 61 preferably consists of a pointed blade, as illustrated in Fig. 11 of the drawings, but any other suitable device may be employed for enabling the push bars to properly engage soft or slippery surfaces.

The pivotally mounted adjustable support is yieldably connected with a pair of opposite gear elements 63ª by links 64ª provided at their rear ends with eyes to receive the said superimposed pivot 46 and having slots 65 in their front portions to receive pivots 66 carried by arms or extensions 67 of the gear elements. The gear elements 63ª are mounted on suitable pivots 68 of standards 69, and their arms 67 project upwardly and are adapted to be oscillated backwardly and forwardly to raise and lower the adjustable support and the propelling mechanism carried by the same. The adjustable support and the push bars are yieldably maintained in position with relation to the gear elements by coiled springs 70 disposed on the front portions of the links 64ª and interposed between shoulders 71 thereof and the said arm 67 and adapted to yield to permit the adjustable support and the push bars to rise should the latter encounter an obstruction whereby injury to the propelling mechanism will be effectually prevented through such accidental contact with a stone or other obstruction. The gear elements 63ª which are provided at their lower ends with spur teeth, mesh with pinions 72 keyed or otherwise fixed to transverse shaft 73 which is journaled in suitable bearings of the rear axle, but the shaft 73 may be mounted in any other suitable manner. The shaft 73 has fixed to it a central worm wheel 74 which meshes with a vertical worm 75 of a shaft 76 journaled in suitable bearings of a stand 77 and formed at its upper end with an operating device 78 which is preferably in the form of a crank handle. The crank handle is provided with a spring actuated latch 79 arranged to engage suitable notches or openings in the top of the stand and preferably in the form of a lever mounted on the crank 78 by a suitable pivot 80 and having a grip or handle portion arranged adjacent to the grip or handle portion of the crank 78, a coiled spring 81 being preferably interposed between the grip or handle of the crank and the grip or handle of the latch lever, as clearly shown in Fig. 4 of the drawings. By rotating the vertical worm through the crank handle 78 motion is communicated to the gear elements which are oscillated to raise or lower the adjustable support and the propelling mechanism carried by the same.

What is claimed is:

1. A motor propelled vehicle including spaced crank shafts having corresponding crank bends, a link connecting the crank bends for causing the shafts to rotate in unison, a push bar hung from the crank bend of one of the said shafts, and means for connecting the push bar with the crank bend of the other shaft for maintaining the push bar in a relatively rigid position.

2. A motor propelled vehicle including spaced crank shafts provided with corresponding crank bends, a push bar supported by the crank bend of one of the shafts, a brace or thrust bar connecting the push bar with the crank bend of the other shaft to maintain the push bar in a relatively rigid position, and means for rotating the shafts.

3. A motor propelled vehicle including spaced crank shafts provided with crank bends, a push bar hung from the crank bend of one of the shafts, a brace or thrust bar connecting the push bar with the crank bend of the other shaft, and a link connecting the crank bends for causing the shafts to rotate in unison.

4. A motor propelled vehicle including spaced crank shafts having crank bends, a push bar composed of slidably connected sections, one of the sections being connected with the bend of one of the shafts, means for connecting the other section of the push bar with the crank bend of the other shaft, and means for cushioning the sections of the push bar.

5. A motor propelled vehicle including a push bar comprising an upper section provided with a guide having spaced side portions forming an opening, a lower section slidable through the guide and extending into the said opening, and yieldable means for cushioning the lower section, said yieldable means being mounted in and exposed at the opening in the upper section.

6. A motor propelled vehicle including a push bar comprising an upper section having spaced sides forming an opening, said upper section being provided at its lower portion below the said opening with a guide, a lower section slidable through the guide and provided at the said opening with a head, and a coiled spring mounted within the opening of the upper section and arranged to be compressed by the head of the lower section.

7. A motor propelled vehicle including a push bar having a cushioned lower section provided with a projecting portion and a shoe having a socket to receive the said projecting portion and detachably secured on the same.

8. A motor propelled vehicle including an adjustable support, spaced crank shafts, one of the crank shafts constituting a pivot for the adjustable support and the other crank shaft being carried by the same, and a push bar connected with and actuated by the crank shafts.

9. A motor propelled vehicle including an adjustable support, spaced crank shafts, one of the crank shafts being carried by the support and the other constituting a pivot for the same, said crank shafts being provided with corresponding crank bends, push bars connected with and actuated by the crank bends of the said shafts, and means connected with the adjustable support for raising and lowering the same.

10. A motor propelled vehicle including an adjustable support, spaced crank shafts, push bars connected and actuated by the crank shafts and carried by the support in its adjustment, and means for raising and lowering the support.

11. A motor propelled vehicle including spaced front and rear crank shafts, an adjustable support comprising rearwardly extending links or bars pivotally mounted on the front crank shaft and having bearings receiving the rear crank shaft, arms extending upwardly from the front crank shaft, a superimposed pivot carried by the upwardly extending arms, and a connecting member extending from the superimposed pivot to and provided with bearings for the rear crank shaft, and push bars connected with and actuated by the crank shafts.

12. A motor propelled vehicle including a frame having rearwardly projecting arms, a front crank shaft journaled in the said arms, a rear crank shaft spaced from the front crank shaft, oscillatory means connecting the rear crank shaft with the front crank shaft, means for raising and lowering the rear crank shaft, and push bars connected with and actuated by the crank shafts.

13. A motor propelled vehicle including a pivotal support, push bars carried by the same, and gearing connected with the support for raising and lowering the same and having an operating device.

14. A motor propelled vehicle including a pivotal support, push bars carried by the same, a gear element, yieldable means for connecting the gear element with the pivotal support, and operating means including a gear meshing with the said gear element for raising and lowering the pivotal support.

15. A motor propelled vehicle including a pivotal support, a push bar carried by the same, a gear element, a link having a slidable connection with the gear element, and operating means including a gear meshing with the said gear element.

16. A motor propelled vehicle including a pivotal support, a push bar carried by the same, a gear element, a link connected with the pivotal support and having a slotted connection with the gear element, a spring connected with the link and yieldably holding the support against upward movement, and operating means including a gear meshing with the gear element.

17. A motor propelled vehicle including a pivotal support, a push bar carried by the same, a gear element having a projecting arm, means for connecting the support with the said arm, and operating means including a gear meshing with the gear element.

18. A motor propelled vehicle including a pivotal support, a push bar carried by the same, spaced gear elements located at opposite sides of the vehicle and connected with the pivotal support, a transverse shaft having pinions meshing with the gear elements, and means for rotating the transverse shaft to raise and lower the support.

19. A motor propelled vehicle including a pivotal support, a push bar carried by the same, spaced gear elements located at opposite sides of the vehicle and connected with the pivotal support, a transverse shaft having pinions meshing with the gear elements, a worm wheel mounted on the transverse shaft, and a worm shaft having a worm meshing with the worm wheel, said worm shaft being also provided with an operating device.

20. A motor propelled vehicle including a pivotal support, a push bar carried by the same, spaced gear elements located at opposite sides of the vehicle and connected with the pivotal support, a transverse shaft having pinions meshing with the gear elements, a worm wheel mounted on the transverse shaft, a stand, a worm shaft journaled in the stand and having a worm meshing with the worm wheel, an operating device connected with the worm shaft, and a latch for locking the worm shaft in its adjustment.

21. A motor propelled vehicle including a frame, a support pivotally connected with the frame, spaced crank shafts, one of the crank shafts constituting a pivot for the support and the other crank shaft being carried by the support, a push bar connected with and actuated by the crank shafts, a motor carried by the said frame, and means for connecting the motor with the crank shaft which pivots the said support.

22. A motor propelled vehicle including a frame, a support pivotally connected with the frame, spaced crank shafts, one of the crank shafts constituting a pivot for the support and the other crank shaft being carried by the support, a push bar connected with and actuated by the crank shafts, a motor carried by the said frame, a gear mounted on the crank shaft which pivots the support, and means for transmitting motion from the motor to the said gear.

In testimony whereof I affix my signature in presence of two witnesses.

WILLIAM SCHIERDING.

Witnesses:
MARTIN P. V. KIEHERT,
HENRY BILLBEY.

Copies of this patent may be obtained for five cents each, by addressing the "Commissioner of Patents, Washington, D. C."